United States Patent
Stamm et al.

(10) Patent No.: US 7,063,535 B2
(45) Date of Patent: Jun. 20, 2006

(54) SYSTEM AND METHOD FOR FACILITATING EARLY CHILDHOOD BRAIN DEVELOPMENT

(75) Inventors: Jill Stamm, 6422 N. 30th Pl., Phoenix, AZ (US) 85016; Janet Johnson, Phoenix, AZ (US)

(73) Assignee: Jill Stamm, Phoenix, AZ (US)

( * ) Notice: Subject to any disclaimer, the term of this patent is extended or adjusted under 35 U.S.C. 154(b) by 160 days.

(21) Appl. No.: 10/028,335

(22) Filed: Dec. 21, 2001

(65) Prior Publication Data
US 2003/0118975 A1 Jun. 26, 2003

(51) Int. Cl.
G09B 19/00 (2006.01)

(52) U.S. Cl. .............. 434/236; 434/156; 434/247; 434/365

(58) Field of Classification Search ............. 446/227; 434/238, 236, 237, 156, 188, 219, 247, 365; 206/579
See application file for complete search history.

(56) References Cited

U.S. PATENT DOCUMENTS

| 5,603,658 A | * | 2/1997 | Cohen ............... 463/1 |
| 5,951,298 A | * | 9/1999 | Werzberger ......... 434/178 |
| 6,449,460 B1 | * | 9/2002 | Logan ............... 434/308 |
| 2003/0113703 A1 | * | 6/2003 | Strickland et al. |
| 2003/0124500 A1 | * | 7/2003 | Frankenberry et al. |

OTHER PUBLICATIONS

"The Learning Basket(TM) Approach", Center of Imaginal Education, The Institute of Cultural Affairs (Chicago, Illinois), 6 pp.

"Brilliant! Beginnings (TM) Baby Brain Basics (TM) Birth to 12 Months Parent Kit" which includes: (1) "Baby Brain Basics Guidebook: Birth to 12 Months"; (2) "Friendly Faces: Baby's Rhyming Photo Book"; (3) Toyguide: Birth to 12 Months; (4) "Music For Your Baby's Brain CD: Birth to 12 Months"; (5) "Classical Music: For Your Baby's Brain" (CD); and registration card.

* cited by examiner

Primary Examiner—Dmitry Suhol
(74) Attorney, Agent, or Firm—Snell & Wilmer L.L.P.

(57) ABSTRACT

The present invention provides caregivers with pragmatic systems and methods for implementing current knowledge of early childhood brain development and for facilitating meaningful interaction with a child in their care. The invention further provides systems and methods that enable caregivers to provide a child with a stimulating environment that includes purposeful activities in a playful, interactive context.

1 Claim, 10 Drawing Sheets

| 200 | ACTIVITY CARD | 204 — APPROX. AGE |

202 — STAGE OF CHILD
   [BOX NUMBER]

206 — ASPECT OF BRAIN DEVELOPMENT
208 — & TOPIC
   [KIND OF ACTIVITY]

210 — GENERAL REMARKS
   [MATERIALS NEEDED]

212 — DIRECTIONS

214 — EXTENSIONS & VARIATIONS

216 — BRAIN LINK          SCHOOL LINK — 218

FIG. 2

|  | SECURITY | TOUCH | VISION |
|---|---|---|---|
| ATTENTION | Routines<br>Consistency<br>Eye contact<br>Focus on face<br>TV off<br>Specific time for activities<br>Quiet place<br>Rituals | Touching child's shoulder (to direct attention)<br>Standing close to child<br>Hugs<br>Textures<br>Massage<br>Playing hand games<br>Pointing in a book<br>Cuddling while reading | Pointing and directing<br>Activity mat<br>Bright colors<br>Tracking objects<br>Puzzles<br>Eye contact<br>Peek-a-boo<br>Baby talk ("Parentese")<br>Facial expressions<br>Eye level discussion<br>"Watch me" |
| BONDING | Hugs<br>Holding/touching<br>Food-eating<br>Being Responsive<br>Rituals | Rubbing back<br>Stroking head<br>Holding on lap<br>Massage<br>Holding hands<br>Cuddling<br>Writing on back<br>Dancing | Direct eye contact<br>Smiles<br>Baby talk ("Parentese")<br>Face-to-face |
| COMMUNICATION | Promise of return<br>"I love you"<br>Touching and singing<br>Reading books | Snuggling<br>Holding, squeezing<br>Safety and trust<br>Describing words<br>Feeling words<br>"Look at me" | Pointing and naming<br>Same/different<br>Baby talk ("Parentese")<br>Facial Expressions<br>Reading to child<br>Eye level communication |

FIG. 3A

|  | PLAY | SOUND |
|---|---|---|
| ATTENTION | Bright colors<br>Activity Mat<br>Interactive Modeling<br>Rituals<br>Finger plays<br>Activities<br>"Watch me" | Talking/singing<br>Musical toys<br>Whispering<br>Music<br>Rituals<br>Dancing with child<br>Learning a song<br>Nursery rhymes<br>Voice variations<br>Music as signal |
| BONDING | True play<br>Rituals<br>Going to the park<br>Play time<br>Undivided attention | Humming<br>Singing<br>Laughter<br>Dancing with child<br>Sharing enjoyment of music<br>Holding child on lap while reading a story |
| COMMUNICATION | Kissing<br>Loving<br>"Parentese"<br>Listening activities<br>Rituals | "Parentese"<br>Singing<br>Reading<br>Finger plays<br>Learning songs, nursery rhymes |

FIG. 3B

| Age & Stage | Security | Touch |
|---|---|---|
| Infant<br>(0-6 mos. & beyond) | Mirroring Facial Expressions;<br>Holding & Shaking Rattle;<br>Listening & Interacting with Book | Enjoying a massage;<br>Playing with feet;<br>Listening & Interacting with Book;<br>Playing with Ball |
| Baby<br>(6-18 mos. & beyond) | Sharing Family Photo Album;<br>Reading Books | Stacking Blocks;<br>Scoop & Fill |
| Toddler<br>(18 mos. to 3 yrs. & beyond) | Reading Interactive Books | Experimenting with Water;<br>Sequencing Snap-Lock Beads |
| Preschooler<br>(3-6 yrs. & beyond) | Identifying Family Members;<br>Reading a Variety of Books;<br>Discussing & Playing with Activity Mat;<br>Setting a Table | Puzzles;<br>Treasure Hunting;<br>Sweeping & Scissor Cutting;<br>Drawing & Writing-Scribble;<br>Telling Stories;<br>Tracing Tactile Letters & Saying Sounds of Letters;<br>Trace & Write Letters/Numbers |

FIG 4A

| Age & Stage | Vision | Play | Sound |
|---|---|---|---|
| Infant<br>(0-6 mos. & beyond) | Playing with Links;<br>Identifying & Describing Clothes;<br>Listening & Interacting with Books | Communicating & Playing with Puppet | Listening to CD;<br>Exploring Sound with Toys;<br>Listening & Interacting with Books |
| Baby<br>(6-18 mos. & beyond) | Matching Objects by Color;<br>Reading Interactive Book;<br>Stacking Tower | Communicating & Playing with Puppet | Reading Interactive Books;<br>Listening, Saying & Singing Rhymes & Songs |
| Toddler<br>(18 mos. to 3 yrs. & beyond) | Sort by Color or Shape;<br>Matching 2-Piece Picture/Word Puzzles | Communicating & Playing with Puppet | Listening & Talking on the Phone;<br>Listening & Interacting with Books |
| Preschooler<br>(3-6 yrs. & beyond) | Reading Environmental Print;<br>Lacing & Tracing Animals;<br>Elementary Math Concepts;<br>Recognizing Numbers & Counting;<br>Using Moveable Alphabet to Find Letters & Make Words | Communicating & Playing with Puppet | Identifying Sounds;<br>Reading & Singing;<br>Matching Words with Pictures;<br>Playing Keyboard & Singing;<br>Identifying & Matching Beginning Sounds, Letters & Words;<br>Matching Alphabet/Picture/Word Puzzles;<br>Reading Environmental Print |

FIG 4B

| | |
|---|---|
| *INFANT* | 0-6 MONTHS AND BEYOND |

*VISION*

*ACTIVITY: READING INTERACTIVE BOOKS*

MATERIALS NEEDED: RED, BLACK & WHITE FUN LINKS; A BOOK

GENERAL REMARKS: NEWBORNS CAN SEE FROM BIRTH, BUT THEIR VISION IS NOT FULLY DEVELOPED. UNTIL YOUR INFANT IS APPROXIMATELY 6 MONTHS OF AGE, HE/SHE WILL RESPOND BEST TO BOLD, CONTRASTING COLORS AND GRAPHICS. THAT IS WHY IT IS IMPORTANT TO PROVIDE YOUR BABY WITH TOYS THAT FEATURE THE VISUAL EXTREMES OF BLACK, WHITE, AND RED. THESE HIGH CONTRAST COLORS WILL CAPTIVATE AND HELP HOLD YOUR BABY'S ATTENTION.

DIRECTIONS: PLACE YOUR BABY IN YOUR LAP ON HER/HIS BACK. HOLD A CHAIN OF A FEW LINKS 8" TO 12" ABOVE YOUR BABY'S HEAD AND SHAKE IT UP AND DOWN OR FROM SIDE TO SIDE. WHEN YOUR BABY REACHES FOR THE LINKS, PUT THEM IN HIS/HER GRASP. AS BABY GRASPS, PULLS, AND PLAYS WITH THE TEXTURED LINKS, TALK TO YOUR BABY USING *PARENTESE* (*E.G.*, VERY SLOW, EXPRESSIVE "BABY TALK").

FOR INSTANCE, SAY: "LOOOK AT THE RRRED, BLAAACK, AND WHIIITE LINKS." CONTINUE TALKING WHILE INTERACTING WITH YOUR BABY.

AFTER CONNECTING SEVERAL LINKS TO YOUR BABY'S CRIB, CAR SEAT, STROLLER, OR HIGH CHAIR, WATCH YOUR BABY AS HE/SHE ATTEMPTS TO GRASP, PULL, AND PLAY WITH THE LINKS. WHILE PLAYING, ENJOY LAUGHING AND TALKING TOGETHER. WHEN THE BABY GETS OLDER, THESE SAME KINDS OF LINKS CAN BE MANIPULATED BY THE CHILD TO LINK AND UNLINK TO FORM NEW PATTERNS.

*CAUTION: DO NOT CONNECT LINKS ACROSS CRIB OR PLAYPEN. FORMING A CHAIN OF MORE THAN 12 INCHES LONG CAN POSE A CHOKING HAZARD.*

EXTENSIONS AND VARIATIONS
- ATTACH OTHER SAFE MOBILES AND TOYS TO YOUR BABY'S CRIB, CAR SEAT, STROLLER OR HIGH CHAIR FOR YOUR BABY TO GRASP, PULL, AND PLAY WITH. TALK WITH YOUR BABY WHILE HE/SHE INTERACTS WITH THE TOY AND YOU.
- LATER, AFTER MODELING, ASK THE CHILD TO USE THE LINKS TO SORT BY COLOR.
- LATER, AFTER MODELING, ASK THE CHILD TO MAKE DIFFERENT LINK SEQUENCES.

*BRAIN LINK:* STIMULATES THE VISUAL AND MOTOR STRIP OF THE BRAIN.

*SCHOOL LINK:* DEVELOPS EYE-HAND COORDINATION NECESSARY FOR WRITING, READING AND MATH ACTIVITIES.

FIG. 5

| BABY | 6-18 MONTHS AND BEYOND |

*SECURITY & EMOTIONAL ATTACHMENT*
*ACTIVITY: READING INTERACTIVE BOOKS*

MATERIALS NEEDED: ACTIVITY MAT, A BOOK

GENERAL REMARKS: IT IS NEVER TOO EARLY TO START READING TO YOUR BABY. RESEARCH SHOWS THAT REGULAR READING WITH EXPRESSION FOR AT LEAST 15 MINUTES A DAY IS IMPORTANT TO LATER INTELLECTUAL DEVELOPMENT. YOUNG CHILDREN LEARN LANGUAGE THROUGH REPETITION, MIMICKING, AND ADULT MODELING.

PLASTIC, CLOTH, OR STURDY, NON-TOXIC BOARD BOOKS ARE RECOMMENDED SO THE BABY CAN TOUCH THE BOOK. BABIES AT THIS STAGE MAY EVEN PUT THE BOOK IN THEIR MOUTH. THAT IS APPROPRIATE AT THIS STAGE.

DIRECTIONS: HOLD YOUR BABY IN YOUR LAP WITH HER/HIS BACK AGAINST YOUR CHEST SO SHE/HE CAN SEE THE PICTURES AND WATCH YOU TURNING THE PAGES. CUDDLE YOUR BABY TO MAKE HER/HIM FEEL COMFORTABLE AND SECURE DURING THE ACTIVITY.

IF THE BOOK REQUIRES TACTILE INTERACTION, SIT NEXT TO YOUR BABY AT A TABLE OR HIGH CHAIR. PLACE THE BOOK AND OBJECTS ON IT. THE ACTIVITY MAT MAY BE USED TO INCREASE ATTENTION.

- NAME THE PICTURES.
- DESCRIBE THE PICTURES.
- TELL BABY WHAT IS HAPPENING IN THE BOOK.

WE CALL THIS INTERACTION 'BOOK-TALK' WITH THE BABY. IT IS ALSO A TIME TO BUILD A STRONG BOND WITH YOUR BABY.

EXTENSIONS AND VARIATIONS

- LATER DURING THE DAY, TALK ABOUT THOSE EVENTS FROM THE STORY WHEN THE BABY DOES THAT ACTIVITY DURING THE DAY.
- READ ALOUD TO YOUR BABY FROM WHATEVER YOU MIGHT HAPPEN TO BE READING.

*BRAIN LINK:* STIMULATES THE CENTRALLY LOCATED EMOTIONAL PARTS OF THE BRAIN THAT ARE CONNECTED TO ALMOST ALL OTHER CRITICAL REGIONS. ALSO STIMULATES *COGNITIVE & MOTOR* CONNECTIONS IN THE BRAIN THAT PROCESS AND STORE LANGUAGE IN THE CRITICAL FRONTAL AND LEFT TEMPORAL REGIONS.

*SCHOOL LINK:* PROMOTES EMOTIONAL STABILITY AND DEVELOPS SELF-ESTEEM NECESSARY FOR APPROPRIATE SCHOOL BEHAVIOR. ALSO DEVELOPS LOVE OF BOOKS, NEW VOCABULARY WORDS AND CONCEPTS NEEDED FOR SUCCESS IN READING AND COMMUNICATING.

FIG. 6

| TODDLER | 18 MONTHS – 3 YEARS AND BEYOND |

TOUCH & SENSORY INTEGRATION
*ACTIVITY: EXPERIMENTING WITH WATER*

MATERIALS NEEDED: TRAY, WATER, SMALL PITCHER, 2 PLASTIC MEASURING CUPS, SMALL TOY CUP, SIPPER CUPS, FUNNEL, BASTER, SPONGE

DIRECTIONS: SELECT A LOCATION TO HAVE FUN EXPERIMENTING WITH WATER.

SAY: *"WATCH!"*

USE THE TRAY TO FOCUS ATTENTION. FILL THE PITCHER WITH WATER. FROM THE BAG OF WATER TOOLS (SMALL PITCHER WITH SPOUT, MEASURING CUPS, SMALL CUP, SPILL PROOF SIPPER CUPS, METAL CREAMER), SELECT ONE ITEM TO DEMONSTRATE HOW TO POUR. SHOW CHILD HOW THE BASTER WORKS. DEMONSTRATE USE OF FUNNEL.

THEN SAY: *"JOIN ME."* OR *"YOU TRY IT"*. THEN LET YOUR TODDLER EXPERIMENT POURING INTO DIFFERENT CONTAINERS. CELEBRATE YOUR TODDLER'S ACCOMPLISHMENTS.

AFTER ENJOYING POURING, SAY: "WATCH". PLACE EACH ITEM BACK INTO THE BAG. TAKE THE SPONGE AND DEMONSTRATE HOW TO WIPE UP THE WATER IN THE TRAY. INVITE YOUR TODDLER TO TAKE A TURN WIPING UP THE SPILLED WATER. ALSO INVITE HIM/HER TO PUT ITEMS BACK INTO THE BAG.

REMEMBER TO BE POSITIVE DURING THIS ACTIVITY EVEN IF YOUR TODDLER SPILLS WATER OR MAKES A MESS.

EXTENSIONS AND VARIATIONS

- LATER, EXTEND SIMILAR ACTIVITIES IN THE BATH OR POOL OR OUTSIDE WITH A DISHPAN. CAUTION: ADULT SUPERVISION IS SUGGESTED FOR ALL ACTIVITIES, ESPECIALLY WATER ACTIVITIES.
- ADD VOCABULARY WORDS: BIG, LITTLE; MORE, LESS; TALL, SHORT; FULL, EMPTY ... ETC.
- HELPING IN THE KITCHEN, POURING SMALL AMOUNTS OF LIQUIDS IN TODDLER'S CUP OR BOWL.
- ADD OTHER TOYS AND OBJECTS THAT FLOAT OR SINK (*E.G.*, TOY DUCK, EGG CARTON, SINKING OBJECTS, EMPTY CONTAINERS). EXPERIMENT AND DISCUSS USING VOCABULARY: FLOAT, SINK, HEAVY, LIGHT ... ETC.

*BRAIN LINK:* STIMULATES THE PART OF THE BRAIN THAT PROCESSES SPATIAL REASONING (VOLUME AND QUANTITY) IN THE SENSORY MOTOR STRIP AND THE PARIETAL LOBE.

*SCHOOL LINK:* DEVELOPS DEXTERITY AND EYE-HAND COORDINATION. ALSO DEVELOPS SPATIAL REASONING CRITICAL FOR MATH AND SCIENCE.

FIG. 7

| | |
|---|---|
| *PRESCHOOL* | 3 1/2 – 4 1/2 YEARS AND BEYOND |

*VISION & VISUAL DISCRIMINATION*
*ACTIVITY: READING ENVIRONMENTAL PRINT*

MATERIALS NEEDED: ACTIVITY MAT, CHEERIOS®-BREAKFAST SIZE BOX, PETER PIPER PIZZA® LABEL, MCDONALD'S® - BAG OR CUP OR NAPKIN, BURGER KING® - BAG OR CUP OR NAPKIN, K MART® – BAG, WINNIE-THE-POOH® LABEL, PLAY DOH®, BAND-AID® LABEL, GOLDFISH® LABEL, STOP SIGN, LAMINATED COLORED DECK OF 10 MATCHING LOGOS, LAMINATED BLACK & WHITE DECK OF 10 MATCHING LOGOS

GENERAL REMARKS: YOU MAY NOT REALIZE IT, BUT CHILDREN HAVE BEEN READING *ENVIRONMENTAL PRINT* (RECOGNIZING SIGNS, LABELS AND LOGOS OF PLACES AND PRODUCTS FOUND IN A HOME OR COMMUNITY) FOR SEVERAL YEARS. THEIR RECOGNITION OF WORDS IN THE ENVIRONMENT CAN BE AN IMPORTANT LINK TO EARLY READING SKILLS. THIS ACTIVITY ENCOURAGES READING OF ENVIRONMENTAL PRINT AS IT GRADUALLY CHANGES FROM THE ORIGINAL CONCRETE FORM TO A FORM THAT EVENTUALLY IS TYPICAL PRINT.

DIRECTIONS: LAY THE DECK OF COLORED ENVIRONMENTAL PRINT CARDS FACE UP IN A 2 CARD X 5 CARD GRID ON THE ACTIVITY MAT. ASK THE CHILD TO MATCH HIS BLACK AND WHITE DECK OF CARDS TO THE COLORED LOGO CARD. POINT TO ONE OF THE LOGO CARDS. SAY: "CAN YOU FIND THE WORD THAT MATCHES THIS CARD IN YOUR DECK OF CARDS?" READ THE WORDS TOGETHER. POINT OUT THE DISTINCTIVE BEGINNING OR ENDING LETTERS. PRAISE EACH MATCH.

EXTENSIONS AND VARIATIONS

- CREATE A CONCENTRATION-TYPE GAME BY MIXING THE 4 COLORED CARDS TOGETHER WITH THE MATCHING 4 BLACK AND WHITE CARDS. LAY THE 8 CARDS FACE DOWN IN A 2-CARD X 4 CARD GRID. TAKE TURNS TRYING TO MATCH AND MAKE PAIRS BY MEMORIZING THE POSITION OF THE MATCHING LOGOS. SAY: "TURN OVER A CARD AND THEN TRY TO MATCH IT WITH THE SAME WORD BY TURNING OVER ANOTHER CARD. NOW READ THE WORD YOU TURNED UP." EACH MATCH IS A STEP TOWARD READING! ENCOURAGE YOUR CHILD. REMEMBER TO PRAISE.
- MATCH THE CARDS TO ITEMS THAT MAY BE ON YOUR SHELVES OR IN YOUR REFRIGERATOR.

BRAIN LINK: STIMULATES THE VISUAL PART OF THE BRAIN. ALSO STIMULATES THE PART OF THE BRAIN THAT PROCESSES AND STORES LANGUAGE IN THE CRITICAL FRONTAL AND LEFT TEMPORAL REGIONS.

SCHOOL LINK: HELPS WITH PATTERN/WORD MATCHING NECESSARY FOR LATER IDENTIFICATION OF LETTERS AND WORDS NEEDED FOR ONE-TO-ONE CORRESPONDENCE IN BEGINNING READING.

FIG. 8

SYSTEM AND METHOD FOR FACILITATING EARLY CHILDHOOD BRAIN DEVELOPMENT

FIELD OF THE INVENTION

The present invention relates generally to educational systems and methods for promoting child development and, more particularly, to educational materials that facilitate healthy early childhood brain development.

BACKGROUND

Until recently, neuroscientists generally believed that intelligence was primarily a heritable trait and that intellectual potential is therefore mostly predetermined. In this regard, the brain was thought of as a relatively static entity that utilizes a pre-defined, unalterable set of instructions to foster its own development and engage in the process of learning. While parallels were frequently drawn between the type of environment in which an individual was reared and the personal achievements enjoyed by that individual over the course of a lifetime, medical researchers lacked the ability to chart or tap the inner workings of the brain that were responsible for these observations.

Scientific and medical advances, however, have pushed the frontiers of neuroscience beyond inveterate notions of human potential and have lead to an acknowledgment that much of the brain and its intellectual capacity develops after birth. Research using a variety of imaging technologies has demonstrated that the brain is a dynamic, highly adaptive organ in which microstructures develop, at least in part, in response to external stimuli. The imaging techniques that have permitted scientists to view the living brain in action include technologies such as positron-emission tomography (PET) (which measures blood flow in the brain and can identify activity levels in particular regions of the brain), magnetic resonance imaging (MRI) (which shows the particular structures of the brain), and electroencephalograms (EEG) (which show the flow of electrical energy through the brain). For more information about the brain and its intellectual and emotional development, see R. Kotulak, *Inside The Brain: Revolutionary Discoveries of How The Mind Works* (McMeel Publishing, 1997); R. Shore, *Rethinking The Brain: New Insights into Early Development* (Families and Work Institute, 1997); and C. Ramey and S. Ramey, *Right From Birth: Building Your Child's Foundation For Life* (Goddard Press, 1999); each of which is hereby incorporated by reference for general information on the brain and its development.

Early childhood (i.e., birth to about age six) is generally regarded as the period in which caregivers can have the most significant influence on brain development and, consequently, a child's later ability to think and acquire knowledge. As the child learns about his world, those "lessons" actually form, or shape, the brain and the manner in which the brain processes information. It is during this early period that the connections (synapses) that form between nerve cells (neurons) develop at a rate which surpasses that at any other time in life. Indeed, far more synapses are formed during this period than will eventually be needed. The brain of a typical two-year old, for example, has twice the number of synapses of an adult. Once these synapses are formed, those that are not needed or are not reinforced by repetitive use are believed to be selectively destroyed through a process that is referred to as "neural pruning".

Neural pruning is a natural and healthy aspect of the maturing brain that promotes the development of more efficient synaptic circuitry later in life. However, this process can also negatively impact a child's learning potential, if the child is raised in a sub-optimal environment. For example, when a child is raised in a deprived or neglectful environment, neural pruning can impede the formation of what otherwise would be important brain circuits, because synapses that may be useful for later learning are pruned away due to lack of use. Similarly, when a child is raised in a highly stressful environment, neural pruning can reinforce brain circuits that are constantly on high alert, because synapses that otherwise would be pruned away are maintained due to repetitive use. In the latter case, the (mal) adaptive "high alert" circuitry can result in outward behaviors like impulsiveness, aggressiveness, and difficulty in focusing attention, all of which render future learning in a regular classroom setting much more difficult.

Clearly, the knowledge gained by neuroscientific research in recent years offers caregivers a unique opportunity to improve the intellectual and emotional well-being of a child in their care and thereby provide the child with a solid foundation for future learning. Accordingly, there is a need for pragmatic systems and methods that enable caregivers to implement current knowledge of early childhood brain development and that facilitate meaningful interaction between a caregiver and a child in their care. There is also a need for systems and methods that enable caregivers to provide a child with a stimulating environment that includes purposeful activities in a playful, interactive context.

SUMMARY

The present invention provides caregivers with pragmatic systems and methods for implementing current knowledge of early childhood brain development and for facilitating meaningful interaction with a child in their care. The invention further provides systems and methods that enable caregivers to provide a child with a stimulating environment that includes purposeful, shared activities in a playful, interactive context. In an exemplary aspect, the system of the invention comprises stage-specific activity cards comprising caregiver directions for facilitating an interactive play session with a child, and at least one item whose use by a caregiver during the interactive play session is designed to stimulate a predetermined aspect of brain development. The predetermined aspect of brain development comprises at least one of security and emotional attachment, touch and sensory integration, vision and visual discrimination, play and playfulness, and sound and auditory discrimination. In another exemplary aspect, the method of the invention comprises obtaining a system for facilitating early brain development that targets a predetermined stage of development; selecting an activity card, which describes at least one activity that stimulates a predetermined aspect of brain development; engaging a child's attention to facilitate an interactive play session with the caregiver; modeling a selected activity for the child in order to instruct the child how to perform the selected activity; and prompting the child to perform the activity.

BRIEF DESCRIPTION OF THE DRAWINGS

The present invention is illustrated by way of example, and not of limitation, in the accompanying figures, in which like references indicate similar elements, and in which:

FIG. 2 illustrates an exemplary activity card in accordance with the invention;

FIGS. 3A–3B are charts which illustrate exemplary activities that stimulate predetermined aspects of brain development and foster the concepts that promote early brain development;

FIGS. 4A–4B are charts which illustrate exemplary stage-specific activities that may be provided or described in various exemplary systems in accordance with the invention; and FIGS. 5–8 illustrate exemplary activity cards in accordance with the invention.

DETAILED DESCRIPTION OF EXEMPLARY EMBODIMENTS

Figure 1:
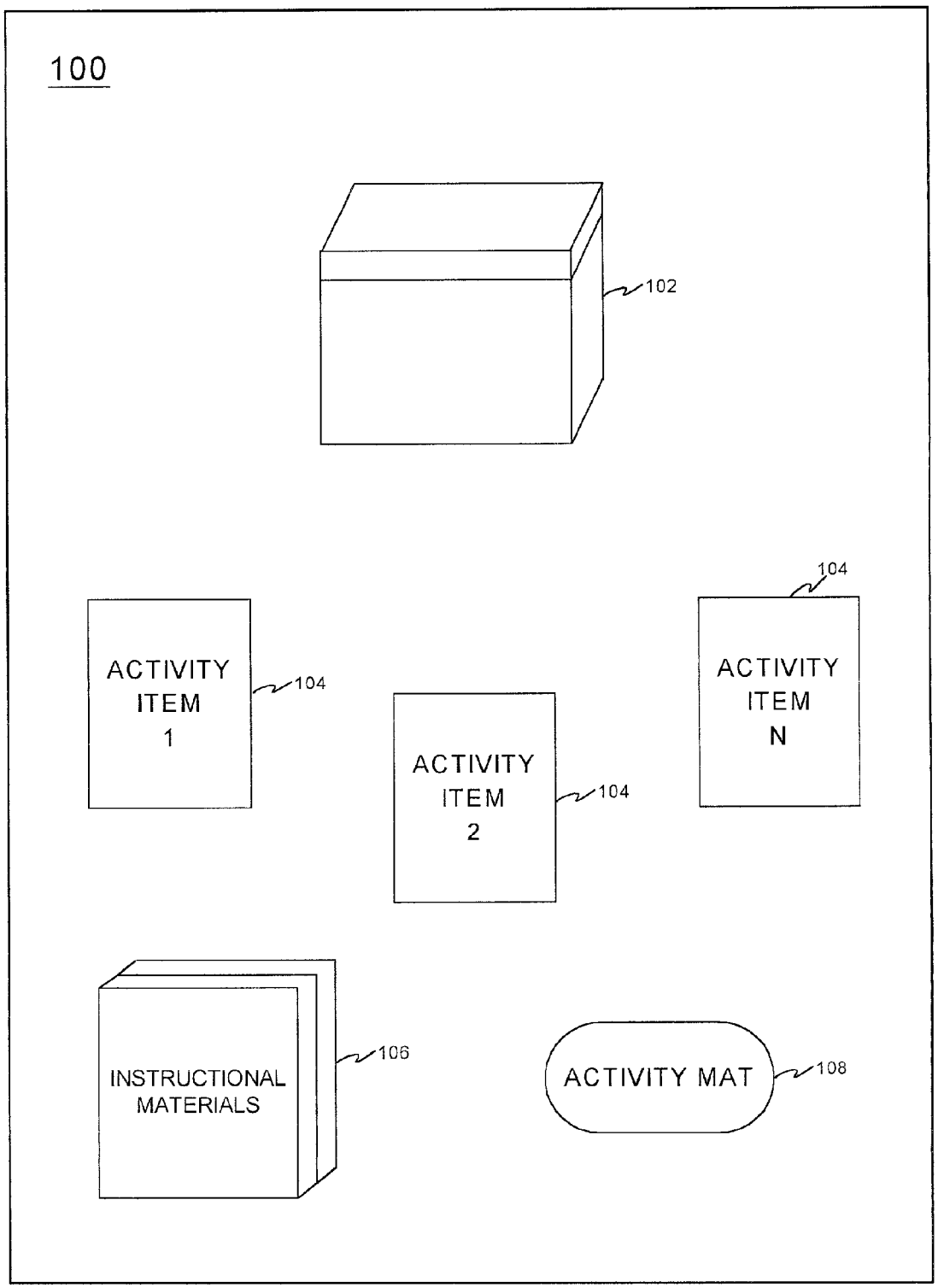
FIG. 1 is a diagram illustrating an exemplary system for facilitating early childhood brain development.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that changes may be made without departing from the spirit and scope of the invention. Thus, the following detailed description is presented for purposes of illustration only and not of limitation, and the scope of the invention is defined solely by the appended claims.

Preliminarily, as used herein, in an exemplary embodiment, the term "child" includes any person who has reached a developmental stage that corresponds to a chronological age of about six years or less. For example, the term "child" shall include any person who has reached a developmental stage that corresponds to an infant (i.e., 0 to about 6 months), a baby (i.e., about 6 months to about 18 months), a toddler (i.e., about 18 months to about 3 years), or a preschool age child (a preschooler) (i.e., about 3 years to about 6 years).

The term "developmental stage" or "stage" includes, in an exemplary embodiment, a period that loosely corresponds to a degree of intellectual capacity or developmental readiness that is characteristically exhibited at the designated chronological age. For example, a particular 4-year old child may be best characterized, developmentally, as being at the "toddler stage", rather than the stage suggested by a chronological age of 4 years, namely, the "preschooler stage". The term "stage" is used herein to underscore that children develop at varying rates and that categorizations based upon chronological age alone may not accurately reflect the actual developmental stage of a given child.

The terms "age" and "stage" include a child who has attained a particular chronological age as well as the corresponding developmental stage. Moreover, the phrase "age and stage" shall also be understood to include a child who has attained a chronological age that is other than a stated age but who is nevertheless at the indicated developmental stage. For example, if a particular activity targets or is considered age appropriate for a child at the age and stage of a toddler, that activity shall be understood to be appropriate not only for children between the ages of about 18 months to about 3 years, but also for children who are either younger than about 18 months or older than about 3 years, if the younger or older child is nevertheless at the stated developmental stage.

The term "caregiver" includes any person who cares for a child for any period of time. The term "caregiver" shall be understood to include a parent, a grandparent, other relatives, a neighbor, a babysitter, a daycare worker, a teacher, a nurse, a sibling, or anyone else who is charged with the care of a child, even on a temporary basis.

FIG. 1 illustrates an exemplary system 100 for facilitating early childhood brain development in accordance with the invention. System 100 is designed to give caregivers the skills and assistance that are needed to promote a child's healthy brain development and may be adapted for use with a child at a particular age and stage, including infant, baby, toddler, and preschooler stages. In one embodiment, system 100 embodies and combines some of the findings of neuroscientists, memory and learning researchers, child development specialists and teachers, and presents these findings in a form that may be understood and implemented in a practical manner by caregivers. In another exemplary embodiment, system 100 facilitates interactive or shared activity sessions that are designed to stimulate the child in a manner that promotes optimal growth and development of the child's brain, thereby fostering future learning success. As illustrated in FIG. 1, exemplary system 100 comprises a housing 102, activity items 104, and instructional materials 106.

The housing 102 may include any suitable apparatus capable of containing or enclosing activity items 104 and instructional materials 106. For example, housing 102 may include a box, a bin, a carton, a tub, a basket, a case, a crate, and/or the like. Housing 102 may be made of any suitable material, including cardboard, plastic, metal, fiberglass, wood, wicker, and/or the like. In another embodiment, housing 102 may be a database which contains, for example, images of activity items 104 and other electronic depictions or representations of text, forms, and/or data that are discussed herein, wherein the database may be included on visual, electronic, optical, audio tapes, video tapes, computer disks, digital disks, or other forms or mediums which may include depictions, graphical recreations, and/or representations of the physical items discussed herein.

It will be appreciated that various electronic implementations of the system of the invention are possible. In one embodiment, the system of the invention may comprise a computing system which may be implemented in the form of a computer-server, a PC server, a networked set of computers, or any other suitable implementation which is known in the art or may hereafter be devised. Further, users (i.e., caregivers and children) may interact with the system via any suitable computing system or input and/or display device (such as a personal computer, personal digital assistant, handheld computer (e.g., Palm Pilot®), laptop, notebook, kiosk, cellular phone, and/or the like). Moreover, a user's computing system may be connected to the system of the invention via any suitable data communications network. Communication between a user and the system may be accomplished through any suitable communication means, such as, for example, a telephone network, public switch telephone network, intranet, Internet, extranet, WAN, LAN, wireless communications, satellite communications, and/or the like. For example, the network may be a public network, which is assumed to be insecure and open to eavesdroppers. In one embodiment, the network is embodied as the Internet. In this context, the computers (e.g., user and/or system) may or may not be connected to the Internet at all times. For instance, a computer may employ a modem to connect occasionally to the Internet, or it might maintain a permanent connection to the Internet. It is noted that the network may be implemented as other types of networks, such as an interactive television (ITV) network.

In another embodiment, the system may comprise a software program which may be implemented by a user in conjunction with any type of personal computer, personal digital assistant, handheld computer, laptop, notebook, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. In this context, the software may be embodied in any suitable storage medium (e.g., a hard disk, CD-ROM, and/or the like) and/or may be downloadable via a communications network from another computing system.

It will be further appreciated that the invention may be embodied as a method, a system, a device, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Activity items 104 may include any number of items with which a caregiver may engage in an interactive play session with a child. Activity items 104 may be used independently or jointly, in any combination, during a given interactive play session. Activity items 104 may include items of any kind that can be used with a child to target a specific aspect of brain development, as described in greater detail below. In an exemplary embodiment, activity items 104 are designed to be used under caregiver supervision with a child at a particular age and stage. In another embodiment, activity items 104 may be embodied in visual, electronic, optical, audio tapes, video tapes, computer disks, digital disks, or other forms or mediums which may include depictions, graphical re-creations, and/or representations of the physical items discussed herein.

In one embodiment, the particular activity items 104 included in any given system 100 are intended as examples to assist in teaching a caregiver a variety of ways in which to interact purposefully with a child and thereby encourage healthy early brain development in that child. In an exemplary embodiment, each of the activity items 104 is selected for inclusion in system 100 based upon its effectiveness in illustrating a particular concept to a caregiver. In another embodiment, an activity item 104 may be selected for inclusion in system 100 because it can assist a caregiver in understanding why a particular activity benefits a child's brain development. In this context, the activity items 104 are not intended as toys for a child to play with alone. While some of the activity items 104 may be considered common "toys", it should be appreciated that the particular item that a caregiver chooses to play with the child is not as important as how the caregiver uses the item to interact with the child. An environment that facilitates healthy brain development is created by the pattern of interaction between the caregiver and the child. The system 100 is designed to teach a caregiver skills that will enable the development of these patterns of interaction and foster the healthy early brain development of a child in their care.

Exemplary activity items 104 may include any of the following: an activity mat 108, books, stuffed animals, games, sound-making items, colorful items, compact discs (e.g., music, software including computerized activities, and/or the like), blocks, puppets, balls, construction toys (e.g., Lego®, Tinkertoys®, and/or the like), pictures, puzzles, beads, musical instruments, crayons, paper, pencils, letters of the alphabet, numbers, and/or the like. In one embodiment, system 100 includes an activity mat 108 which may be used to focus the child's attention to a defined space during the activity. The activity mat 108 may be used as a "workspace" and may provide the child with a concrete cue to pay attention not only to the caregiver but to the activity item(s) placed upon the activity mat 108 as well. In an exemplary embodiment, the use of the activity mat 108 may become a ritual that marks the beginning of a purposeful, interactive activity session. In an exemplary aspect, the activity mat 108 is a neutral color, such as beige, tan, or white, for example, so that the activity mat 108 itself does not distract the child's attention away from the activity.

In an exemplary embodiment, activity items 104 included in a given system 100 may be screened and selected using a variety of criteria. These criteria may include child safety, simplicity, effectiveness in engaging the child in the activity, high child-interest, and/or effectiveness in illustrating and teaching a concept to a caregiver. In one embodiment, each activity item is selected because it is considered safe for a child of a particular age and stage, when the activity item is used with adult supervision and interaction. In another embodiment, each activity item is selected and presented in a simplified form that invites a variety of additions, expansions, and variations. Additional activities derived from additions to, expansions of, or variations of described activities may be indicated in instructional materials 106 or may be devised independently by the caregiver. Additions, expansions, and variations for an activity that are presented in instructional materials 106 may, for example, list other ways that a caregiver can continue, vary, or expand their work with the child by repeating the same or a similar idea using other, perhaps similar, materials, toys, household items, and/or the like.

In one embodiment, since a caregiver may not be trained as a teacher, activity items 104 are explained in direct, concrete terms, and the explanations (as contained in instructional materials 106, described below) may include an exemplary script which contains particular words that the caregiver may use to encourage or prompt the child. In an alternative embodiment, the script may be embodied in electronic form or on an audio tape, video tape, compact disk, or any other form or medium. In one aspect, activity items 104 are designed to help the child develop the ability to learn more easily. In another aspect, activity items 104 are designed to foster the child's social-emotional competence and school readiness. Purposeful and productive interactions between a caregiver and a child are intended to facilitate healthy early brain development, thereby promoting the ability to learn, readiness for formal education, and future educational success.

Instructional materials 106 may include any form of materials (for example, written, electronic, audio tape, video tape, compact disk, and/or like forms or mediums) that provide instruction to a caregiver in using the system 100 with a child. In one embodiment, instructional materials 106 are designed to direct a caregiver in performing an activity with a child as well as provide a caregiver with an understanding of why the activity is beneficial to the child and how the type of activity enables the child to build skills that are related to future school skills. When caregivers understand the "why" of an activity, they are likely to perform those activities more often and more consistently, which benefits the child.

In an exemplary aspect, instructional materials 106 are designed to be used during an interactive session with a child at a particular age and stage. In one embodiment, instructional materials 106 may comprise one or more activity cards which each describes an activity that can be the subject of a caregiver's interactive play session with a child. In another exemplary embodiment, instructional materials 106 comprise an activity card directed to each of five aspects of early childhood brain development, as described in detail below.

An exemplary activity card 200 is illustrated in FIG. 2. In one aspect, each activity card 200 indicates why it is useful to engage in the particular activity(ies) described and how the described activity assists in building skills that are related to a child's future learning potential and readiness for formal education (e.g., school). Activity card 200 may indicate any or all of the following the appropriate stage 202 (e.g., infant, baby, toddler, preschooler) targeted by the activity, the approximate age 204 (e.g., 6–18 months and beyond) for which the activity is suggested, the aspect(s) of brain development 206 targeted by the activity (e.g., security and emotional attachment, touch and sensory integration, vision and visual discrimination, play and playfulness, and/or sound and auditory discrimination, as described in detail below), the topic 208 or kind of activity (e.g., reading, pattern matching, listening, and/or the like), general remarks 210 (such as the particular materials that are recommended for the activity, background information, cautionary information, or explanations for the caregiver, for example), directions 212 for engaging the child in the activity (including, for example, a step-by-step series of interactions and/or words that might be said or actions that might be taken by the caregiver during the activity), extensions and variations 214 of the activity (e.g., suggested alternate activities that may be similar to the described activity or may provide other ways that a caregiver might continue or vary their work with the child on a particular skill by repeating the same idea using other materials, toys, household items, and/or the like), a brain link 216 for the activity (e.g., a description of why the activity promotes brain development, including a description of the area of the brain that is stimulated by the activity), and a school link 218 for the activity (e.g., a description of how development of the targeted capabilities may assist a child in preparing for formal education, such as attending school for example).

In various embodiments of the invention, activity card 200 may be embodied either in a physical activity card or in electronic, audio tape, video tape, compact disk, and/or like forms or mediums. In one embodiment, activity card 200 is a virtual activity card that may be represented on a suitable input and display device, as described above.

In an exemplary embodiment, system 100 is organized in a manner that explains and offers a means to practically implement a purposeful, interactive session between a caregiver and a child. In one embodiment, system 100 facilitates an interactive session that targets at least one of five selected aspects of early brain development. These five selected aspects of early brain development provide a principled framework for the organization of system 100 as well as a structured means for teaching a caregiver how to engage in meaningful interactions with a child. These selected aspects of brain development include: (1) security and emotional attachment; (2) touch and sensory integration; (3) vision and visual discrimination; (4) play and playfulness; and (5) sound and auditory discrimination. Each of these five aspects or areas is described in turn below. It will be appreciated that although each of the five aspects is discussed independently, the development of any of these five aspects or areas of the brain may be dependent upon the development of at least one other aspect and/or the development of one aspect may also promote the development of another aspect. Moreover, an activity that may be described herein as promoting the development of a particular aspect of the brain may also promote the development of one or more other aspects of the brain. In other words, it will be appreciated that early brain development is an organic process. This process is compartmentalized into the five aspects described below for convenience and clarity and with the understanding that these aspects of early brain development are not necessarily discrete from one another and that they may overlap in various respects. Moreover, while many of the theories and processes discussed below are believed to be accurate by many researchers, other theories may exist; however, the present system and method will apply to various theories of brain development.

Security and Emotional Attachment

The systems in the human brain that allow the formation and maintenance of emotional relationships begin to develop during infancy and continue developing through the first years of life. A child's experiences during this early, vulnerable period of life therefore help to shape the child's capacity to form intimate and emotionally healthy relationships.

A child generally needs consistent, predictable, and loving responses from a caregiver to develop and establish trust and a sense of security. Consistent care basically enables the child to make sense of the world sooner. For example, a child who receives predictable care is better able to recognize patterns of human responsiveness and, thus, the child can begin to anticipate responses given by others. Being able to anticipate the predictability of getting one's needs met allows a young child to self-regulate and learn to calm himself The child who receives predictable care is also better able to recognize more abstract relationships, such as the relationship between a cause and its effect, for example. In the case of an infant, for example, behaviors such as rocking, cuddling, and holding the infant create a sense of safety and security and send stimulating signals to the infant's brain. Conversely, the absence of such touch produces stress and seems to slow the rate of important biological processes both within the brain and throughout the body.

The biological potential to bond and form attachments is believed to be genetic. For example, an emotionally and physically healthy mother is drawn to her infant; she feels a physical longing to smell, cuddle, rock, coo, and gaze at the infant. In turn, the infant responds with snuggling, sucking, clinging, and, later, babbling and smiling. In most cases, the mother's behaviors are pleasurable, soothing, and emotionally nourishing to the child, and the child's behaviors bring pleasure and satisfaction to the mother. It is during these shared, positive bonding experiences with a caregiver that a child's emotional attachment begins to develop.

Bonding and emotional attachment have been shown to support brain development. A caregiver's consistent, predictable responses to a child actually stimulate the development of the limbic system deep within the child's brain. R. Shore, *Rethinking the Brain: New Insights into Early Development* (Families and Work Institute, 1997). The limbic system includes various brain structures that are responsible for a human's ability to form healthy emotional relationships, as well as structures that alert other brain systems to fearful or harmful situations. When a caregiver is predictable and responsive, the child develops a sense of trust that her needs will be met. The child's energy is therefore fully available to "wire" her brain in a normal, healthy manner. Predictable, responsive nurturing and sensory-enriched care allow a child to develop a strong bond with the caregiver and promote the development of healthy emotional attachment.

Despite the genetic potential for human bonding and attachment, it is believed that the nature, quantity, pattern, and intensity of early life experiences fulfill that genetic potential. Unfortunately, not all caregivers are emotionally healthy, and some are often unable or unwilling to respond to a child in a consistent manner. A child who has learned that he cannot rely on his caregiver to meet his needs tends to expend a great deal of energy in being fearful and unsure. Biologically, the brains of such children frequently develop in different and, potentially, sub-optimal or unhealthy ways. Without predictable, responsive nurturing and sensory-enriched care, the child's potential for normal bonding and emotional attachment may be unrealized, and the brain systems responsible for healthy emotional relationships may not develop optimally.

Emotional attachment is believed to grow out of the many interactions between a child and her primary caregivers. The quality of a child's initial attachment influences almost all subsequent development, including the following: organization of the brain and nervous system; intellectual potential and language development; the ability to regulate feelings and maintain the bonds of trust; the acquisition of a conscience, identity, and self-esteem; and the establishment and maintenance of relationships with others. B. Perry, "Bonding and Attachment in Maltreated Children: Consequences of Emotional Neglect in Childhood", *Child Trauma Academy Parent and Caregiver Education Series*, Vol. 1 (4), (2001).

Children with attachment disorders have extreme difficulty in developing trusting relationships with others. These children generally have not been able to establish or maintain a consistent, predictable relationship with a primary caregiver. Any of the following factors, especially if a child experiences them during the first two years of life, puts a child at high risk for developing an attachment disorder: maternal drug and/or alcohol use during pregnancy; abuse or neglect during early development; sudden separation (illness or death of the primary caregiver); and an undiagnosed and/or painful illness (e.g., colic or chronic ear infections). In these cases, a caregiver's particular attention to providing a secure, loving environment for the child can potentially offset these factors and facilitate the child's normal emotional and intellectual development.

A recent long-term study has demonstrated that emotionally attached children achieve higher test scores in school. The researchers followed 174 children over 16 years and measured certain factors in the home environment, such as the attachment pattern between infant and caregiver, the child's degree of autonomy, the child's ability to self-regulate, the overall home environment, and the overall level of caregiver stress. The researchers also took early measures of the children's intelligence quotient (IQ). They then tracked the performance of these children in school settings. They measured how well the children adapted to the school environment and analyzed their scores on standardized tests in mathematics, reading recognition, reading comprehension, spelling, and general information. The researchers found that early measures of IQ were clearly predictive of later academic achievement, but, when IQ was a controlled variable, the factor most predictive of achievement was the strength and pattern of the child-caregiver attachment. A. Sroufe, *Socioemotional Development Handbook of Infant Development* (Wiley, 1979).

Being loved and developing a sense of trust in others is believed to give a child the security needed for successful mental and emotional growth. Providing an environment that fosters the feeling that there is at least one person in the world whom the child can depend upon is an important factor in helping to "wire" a child's brain for maximum emotional and intellectual health and well-being. Recent brain research has demonstrated that healthy emotions are important for proper mental functioning and that feelings of security promote effective brain function as well as an efficient memory system. Helping a child to feel safe and secure generally entails "adult-child time" and caring. Since responsive, predictable care enhances the child's perceived security, a caregiver's deliberate and continuous demonstration that the child is cared for can make a difference in that child's emotional development.

Research has demonstrated that children who are emotionally attached and secure learn more effectively. Therefore, in one embodiment, system 100 provides and/or describes at least one activity that is selected to provide a caregiver with practice in helping a child to feel secure, cared for, loved, and/or the like, as appropriate for the child's age and stage of development.

Touch and Sensory Integration

One's sense of touch includes sensory input from both reaching out into the environment to touch things and being touched and held by others. Until recently, touch was probably the most over-looked of a child's senses. However, studies have shown that it is extremely important for a child to be touched and held. A touch on the child's skin sends signals to the brain which cause the formation of neuronal connections that help to stimulate the brain's growth. During the first month of life, the number of neural synapses increases to more than 1,000 trillion, which is about 20 times the number existing at birth. These neural connections are developed through daily verbal and physical interactions that the child shares with parents, siblings, and other caregivers.

Initially, much of the research in this area was conducted with the premature birth population. Researchers consistently found that pre-term infants who were exposed to tactile stimulation in the form of a 15-minute massage twice daily gained nearly 50 percent more weight than those who were not massaged. The massaged infants had better performance in habituation (becoming familiar with a stimulus), orientation (being able to locate where a stimulus is), and motor activity. These infants were released from the hospital six days earlier than the control group. T. Field, "Preschoolers in America are Touched Less and are More Aggressive Than Preschoolers in France", *Early Child Development and Care*, Vol. 151, pp. 11–17(1999).

More recently, researchers have found that many of the benefits of infant massage that had been demonstrated in the premature birth population also can be demonstrated in the healthy newborn population. In fact, healthy infants who were massaged 15-minutes a day, twice a week, spent more time in deep sleep, gained more weight, and were less irritable than infants who were simply rocked for the same amount of time. Since the massaged infants smiled and cooed more, caregivers showed increased responsiveness to the infant, and, ultimately, caregiver-child bonding was enhanced. T. Field, "Preschoolers in America are Touched Less and are More Aggressive Than Preschoolers in France", *Early Child Development and Care*, Vol. 151, pp. 11-17 (1999).

Overall, these studies suggest that tactile stimulation can promote a child's healthy growth and development. Indeed, in providing both eye-to-eye and skin-to-skin contact as well as the exchange of cooing, soothing sounds and smells, and smiles and other expressions, massage, as an exemplary form of touch, can assist in creating a healthy early bonding experience as well as an opportunity to provide the child with a rich tactile experience. Loving touch demonstrably lessens tension, fussiness, and irritability and aids in proper digestion. Consistent tactile stimulation by a caregiver also has been shown to promote weight gain, improved immune function, and increased nerve myelination. Each of these factors, in turn, supports healthy brain and muscle development.

Just as scientists have begun to realize the importance of touch to a child's health, they are now also realizing that the areas of the brain that process touch also help to organize the brain in ways that are important for future success in learning. That is, in learning to reach and grasp, pull and push, and gain fine motor control to purposefully explore the environment, a child's brain develops the foundation for other processes that are important for the child's future intellectual development.

Sensory experiences include such things as touch, movement, body awareness, sight, sound, and the pull of gravity, for example. The brain's ability to organize and interpret this information as it is received by the senses is called sensory integration. In simple terms, sensory integration puts the pieces of the sensory puzzle together so that a child is able make sense of the composite or whole picture. Many fundamental learning skills (e.g., motor skills and attending skills) are, in fact, complex processes that build upon the foundation provided by the brain's ability to integrate the various sources of sensory input. Thus, proper development of the brain's sensory integrative function provides a necessary foundation for later, more complex learning and behavior. A. Ayres, *Sensory Integration and the Child* (Western Psychological Services, 1979).

Research suggests that the primary building blocks of the central nervous system are the senses, the vestibular system (i.e., inner ear balance and sense of self in space), muscle tone and bilateral coordination, and the reactive and discriminatory tactile systems. A healthy, integrated central nervous system organizes input from the environment and processes it to produce a motor or behavioral output that is appropriate to the situation. During every moment of every day, countless bits of sensory information bombard a child's nervous system. It is estimated that about two million bits per second enter the central nervous system. As the child is bombarded with all of this sensory data, her brain responds by engaging in the following processes: (1) selecting essential input and/or filtering out nonessential input; (2) organizing information into meaningful perceptions or patterns; and (3) alerting or attending to new stimuli and/or important stimuli. If the child's brain is unable to integrate this sensory information, then the input is not processed and organized accurately, and the result is abnormal motor output with abnormal feedback. If this cycle persists, the child's brain can become increasingly more disorganized. The consequences of a disorganized central nervous system may include a variety of developmental lags, including behavioral, emotional, and learning problems.

Children of the same age frequently exhibit fundamental differences in their small-muscle/fine motor skills. Learning style, or the tendency to rely more heavily on one sense than the other senses, often is at the core of these developmental differences. L. Bradway and B. Hill, *How to Maximize Your Child's Learning Ability* (Penguin Putnam, 1992). For example, children who have a highly developed sense of sight quickly notice and remember visual cues, such as motion, color, shape, and size. These children are generally attracted to puzzles, blocks, and other eye-hand activities, and, through constant use, these children rapidly develop their fine motor skills. By contrast, children who are naturally attuned to auditory stimuli, such as sound and language, or tactile stimuli, such as touch and motion, tend to excel in skill areas (e.g., verbal expression or physical agility, respectively) that are related to their preferred sense.

Fine motor control develops gradually over time and takes practice. Children benefit from repeated opportunities to develop this skill. As children scribble with writing implements and snip with scissors, for example, they are increasing their finger control and dexterity. Activities that include the precise manipulation of a variety of objects (e.g., scribbling, snipping, molding, pasting, and painting) serve to fine-tune a child's motor skills, which are the same skills that the child will later rely upon when learning how to write. Working with objects of different shapes and sizes, such as puzzles and blocks, for example, also helps the child to master sophisticated hand moves. Even playing finger games, such as "Itsy Bitsy Spider" for example, can help a child's fingers become more nimble. Research suggests that a caregiver can assist a child in mastering complex tasks by engaging in the following process: (1) modeling the activity for the child (i.e., showing the child what to do); (2) prompting the child to perform the activity (e.g., by saying things such as, "Your turn", "Try it here", or "Now you try"); (3) as the child catches-on to the activity, advising the child without directing him (e.g., by gently saying something like "No, it's not that one", rather than "This one"); and (4) challenging the child to do the activity on his own (e.g., "You can do it!").

The motor, cognitive, and perceptual skills necessary for performing intricate activities generally do not develop at the same rate. For example, a child may have developed the fine motor control necessary to build block towers but may not have developed the perceptual ability to realize that the big blocks must go on the bottom. Similarly, the child may be able to clutch a crayon but may still lack the cognitive ability to give form or shape to pictures or letters. A caregiver can facilitate the development of a child's skill in performing such activities by providing the child with a rich variety of opportunities to develop these various skills and by encouraging the child in appropriate ways. For example, if a 2-year-old becomes frustrated with her inability to fit the pieces of a puzzle together, the caregiver may wish to consider putting the puzzle away for a few weeks, and then allowing the child to attempt the activity again when her mental and physical abilities may be better matched.

Research has demonstrated that children who have good sensory integration learn more effectively. Therefore, in one embodiment, system 100 provides and/or describes at least one activity that is selected to provide a caregiver with practice in helping a child to receive tactile stimulation, to explore his environment safely, to integrate multiple sensations effectively, to gain control over his intentions and movements, and/or the like, as appropriate for the child's age and stage of development.

Vision and Visual Discrimination

The eyes are one of the most powerful tools that a young child has to learn about the world. Vision begins to develop at birth, and an infant spends much of his early weeks and months of life learning "how to see" by developing such skills as focusing, teaming his eye movements, tracking moving objects, recognizing depth, developing eye-hand coordination, and making spatial judgments. As the child grows, more complex skills, such as visual perception for example, develop to meet the child's increasing need to understand and interpret his world.

Scientists have found that infants will actively look for objects that provide a great deal of stimulation and will tend to stare at objects that they like longer than objects that they are not as interested in. Indeed, infants will actively search for, be attracted to, and will stare longer at objects that: move and change, have a high degree of contrast, have interesting contours, present complex patterns, have symmetrical designs, and are circular rather than square. Interestingly, these characteristics all apply to the human face. In fact, studies have revealed that an infant's ability to recognize a face develops quite quickly. Newborns exhibit a preference for any face-like stimulus, including, for example, a photo of a real face or a drawing of an oval outline containing three spots which represent the eyes and the mouth. Moreover, newborns will generally prefer to look at outlines of their mothers' or fathers' faces, rather than outlines of strangers' faces.

By two months old, an infant's visual system is sufficiently developed to begin to process the details of the human face, that is, the shape and color of the eyes and mouth, and the shape of the nose and chin. By this time, the infant no longer shows interest in abstract, face-like patterns. Instead, the infant prefers to study real faces or drawings of faces and pays attention to the special features that make each face unique.

By five months old, an infant will lose interest in a person's face, if the face does not demonstrably react, change, or respond to the child.

Initially, an infant's brain learns to process the outlines or contours of objects. Then, as the brain develops, the infant's eyes begin to see edges and straight lines. This developmental hierarchy of visual discrimination generally means that infants and babies are more likely to attend to objects that display sharp, visual contrasts. For example, toys that feature black and white patterns are more interesting to an infant and a baby than toys that contain soft pastel designs. Additionally, infants and babies see and tend to prefer bright, "hot" colors, such as red and yellow, for example, rather than soft or "cool" colors, such as blue and green, for example. Further, objects which have sharp color contrasts help infants and babies to recognize and distinguish the edges of the objects. Recently, a number of toy designers have incorporated bright colors and sharply contrasting patterns in a variety of vision-stimulating toys for infants and babies.

Research has shown that vision is one area of brain development that clearly benefits from early exposure to a wide variety of experiences. Since infants enjoy watching moving objects, a caregiver can facilitate the development of a child's visual capabilities by, for example, bringing toys to life by jiggling them slowly across the child's field of vision. Though a newborn's eye-movements are still slow and jerky, the ability to track moving objects develops rapidly, and development of the infant's ability to anticipate the motion of the object enables them to achieve smoother eye-movement. Anticipation is an important aspect of the development of intelligence, because it enables the child to pre-plan an action.

By about the fourth month, a baby's sight is comparable to about 20/50 (perfect vision is 20/20 and develops at about four years of age). At this point, the child begins to develop an understanding of what she is seeing. Caregivers can facilitate this process by "labeling" (i.e., naming) objects and describing actions. This helps the child to connect words with actions and objects.

As the child begins to crawl, eye/body coordination is further developed. The child learns to judge distances and set visual goals, such as when the child sees something and then moves to touch or grasp it. The sudden freedom that crawling provides allows for many new experiences as well as the rapid development of visual perception skills. The child experiences her own body in relation to other objects and notices differences in size, shape, and position. By about the sixth month, a baby acquires fairly accurate control of her eye movements.

Toddlers generally need opportunities to continue to develop eye/hand/body coordination, eye teaming, and depth perception. Caregivers can help the child in this regard by providing, for example, building blocks for stacking, balls for rolling back and forth, paper and colored crayons for drawing, and toys that interlock (e.g, Lego® toys, Tinkertoys®, and/or the like). These types of activities help improve eye/hand/body coordination.

A major developmental achievement for a child is the ability to transition from real objects to representational thinking. This ability, along with environmental print awareness, develops sometime from about 12 to about 36 months of age and typically emerges around 19 months of age. Research has shown that young children (i.e., those under around 19 months of age) generally treat an image of an object as the actual object itself, rather than treating the image as a symbol for the object. J. S. DeLoache, et al., "Grasping the Nature of Pictures", *Psychological Science*, Vol. 9, pp. 205–210 (1998). When presented with the image, infants and babies will try to pick the image up and move it around. Sometime after about one year of age, a child will just point to the object, rather than attempt to pick it up. That is, a toddler will begin to associate the symbol that represents an object with the object itself. For example, the child may learn that a funny-looking group of squiggly lines represents a sound or a combination of sounds; or that a string of letters is not just a bunch of squiggly lines, but represents a real word; or that a photograph of a cat is not the same thing as a real cat, but is a representation of a real cat. Studies also have found that increasing a child's exposure to symbols (such as pictures, for example) can accelerate the age at which a toddler is able to identify the symbol as a representation. By facilitating the development of a child's ability to mentally substitute a symbol for the actual object, a caregiver promotes the development of brain processes that provide the foundation for the child's capacity to learn to read.

In recent years, studies have revealed that home literacy experiences, or the lack of them, profoundly influence a child's later literacy development. Optimal childhood literacy experiences are generally derived from a caregiver's ability to increase the child's involvement in the story time experience. G. J. Whitehurst, et al, "Outcomes of an Emergent Literacy Intervention in Head Start", *Journal of Educational Psychology*, Vol. 84, pp. 541–556 (1994). Storybook reading is not an instinct, but a caregiver can learn how to interact with children and storybooks with practice, over time. One way in which a caregiver can effectively involve the child while reading a story is to ask the child questions about the story as it is read. For example, a caregiver can ask the child questions about any or all of the following: an individual page; what the child sees on the page; and what is happening on the page. In addition, caregivers can add information to the story that the caregiver is reading to the child. Researchers have found that these types of reading interactions have a significant impact on a child's understanding of the story.

While most children enjoy having stories read to them, many young children also have a short attention span. Hence, younger children need to be actively involved in the reading of the story. Asking the child to predict what he thinks will happen next or asking him to point to a character or discuss some aspect of the illustration is an excellent way to keep his attention. The combination of visual stimulation from the illustrations, the words from the text, and the emotional security of being embraced by a caregiver while the story is being read simultaneously increases language, increases attention span, and nurtures literacy.

A caregiver can optimize the benefits that a child derives from a shared storybook experience when the caregiver keeps the following in mind: (1) read the same books repeatedly (children learn new things each time they hear a story and look at the pictures); (2) ask the child to find and label objects in the storybook (this helps to keep young children involved in the story); (3) ask open-ended questions (asking questions such as "What do you think will happen next?" or "What was your favorite part of the story?", for example, helps children to share their feelings and opinions); (4) expand upon the child's answers (adding to the child's responses encourages them to interact with the caregiver and keeps them involved); and (5) read with enthusiasm (imitating the voices of each of the Three Little Pigs and the Wolf, for example, is fun and exciting and brings the story to life for the child).

Adults tend to like variety, but most young children between the ages of two through seven have a favorite story, and this storybook may be as comforting to them as their best-loved stuffed toy. This presents a question for most caregivers: how to create both variety for the adult caregiver and comfort for the child during story time? Generally, toddlers' and preschoolers' favorite books tend to be short in length, so one possibility is to read two or three books at story time. Another possibility is to read new books first and the favorite book last. When a child begins to read along with the caregiver, this may be an ideal time to have the child read his favorite book to the caregiver or to another child, such as a classmate or a sibling, for example. Frequently, a child's favorite book becomes the first one that he will read independently.

The stories that a caregiver reads to a child may inspire the child to share many of her thoughts, hopes, and fears. These discussions can be much more important than reciting any particular detail of the story. Indeed, quizzing a child about story details may make story time an unpleasant activity for both the child and the caregiver. Rather than asking direct, factual questions, a caregiver may ask open-ended, opinion questions, such as, "Which was your favorite part?" or "Why do you think the character stared at the animal?", for example. Story time may also motivate the child to ask the caregiver questions. In such cases, the caregiver should take their time in answering, share their views, and allow the child to hear the caregiver's thought processes. This activity will do more to teach the child about story interpretation than any number of fact questions. J. Christie, B. Enz, and C. Vukelich, *Teaching Language and Literacy: From Preschool through the Elementary Grades* (Addison, Wesley, and Longman, 1997).

Researchers have investigated children's early attempts at reading familiar storybooks, and they have found that children's storybook-reading behaviors appear to follow a consistent developmental pattern: (1) attending to pictures, not forming stories (the child looks at the pictures in the book and labels or makes comments about them); (2) attending to pictures, forming oral stories (the child looks at the book's pictures and weaves a story across the pages; the child's intonation makes it appear as though she is telling an oral story; and the listener needs to see the pictures to follow the story); (3) attending to pictures, forming coherent stories that resemble the written story (the child reads by looking at the book's pictures; the child's wording and intonation sound like reading; and the listener usually does not need to see the pictures to follow the story); and (4) attending to print (the child attends to the print rather than to the pictures when attempting to read the story). E. Sulzby, *Children's Storybook Reading: Longitudinal Study of Parent-Child Interaction and Children's Independent Functioning*, (Spencer Foundation, 1987).

Children begin the process of learning about the forms and functions of print very early and usually through everyday home experiences. The more opportunities children are given to have stories read to them and to play with print and with writing, the easier it is for them to learn to read and write in a formal education setting. Research indicates that children's knowledge about print tends to follow a loose developmental sequence:

(1) Print is different than pictures. One of the first concepts about literacy that children learn is the distinction between print and pictures. Most children discover the print/picture distinction quite early, often by the age of about three. For example, when a three-year-old is asked to draw a picture and to write his name, the markings he makes when asked to draw a picture likely will be quite different from those he makes when asked to write his name. This distinction is important, because it establishes a separate identity for print and allows children to begin learning about its functions and structure.

(2) Print has meaning. One of the earliest discoveries that a child makes about written language is that print has meaning. Researchers have found that many three-year-olds expect print to be meaningful. This understanding becomes evident when a child points to words on signs, cereal boxes, or menus and asks, "What does that say?" Alternatively, after making marks on a piece of paper, a child may ask, "What did I write?" or comment by saying, "This says, _____", for example.

(3) Print is functional. Print can be used to get things done in daily life. A child's knowledge of the practical uses for print grows substantially during the preschool years. Many caregivers observe children using print in their make-believe play, such as, for example, when a child pretends to be a waitress and jots down orders after a trip to the local restaurant.

(4) Graphic awareness. Children begin to recognize environmental print (i.e., print that occurs in real-life contexts) at a very early age. Several studies have shown that many three-year-olds and four-year-olds can recognize and know the meanings of product labels (e.g., Colgate®, Cheerios®, and Pepsi®), restaurant signs (e.g., McDonald's®, Pizza Hut®, and Dairy Queen®), and street signs (e.g., Stop). Even if a child does not say the correct word when attempting to read such print, the child usually will come up with a related term. For example, when presented with a Coke® can, the child might say "Pepsi®". This logographic reading generally begins quite early.

(5) Phonemic awareness and phonics. Phonemic awareness refers to a child's ability to hear the initial and ending sounds of words. Phonics refers to the child's ability to consistently link specific sounds to specific letter symbols. Many children may not attend to letter-sound relationships until about age five or six, whereas others may show evidence of attending to phonics as young as about age three.

(6) Conventions of print. The conventions of print refer to the social rules (e.g., left-to-right sequences, top-to-bottom sequences, the need for spaces between words, and/or the like) and terminology (e.g., the terms "letters", "words", "page", and/or the like) that are associated with printed materials. Most children learn the conventions of print by watching and participating with their caregivers when the caregivers read them storybooks.

Children begin the process of learning how to write as soon as they are able to hold a writing implement, such as a crayon, in their hands. Therefore, it is important for young children have easy access to writing materials and implements. In fact, writing materials are an important component of a child's play environment. Play provides children with highly pleasurable and meaningful opportunities to experiment with early forms of writing. This exploration and experimentation allows the child to use and perfect developing concepts regarding the function, forms, and conventions of written language.

One researcher has observed very young children's writing efforts and has identified seven broad categories of early writing. E. Sulzby, *Children's Storybook Reading: Longitudinal Study of Parent-Child Interaction and Children's Independent Functioning* (Spencer Foundation, 1987). While a general movement from less mature forms towards conventional forms has been observed, these categories do not create a strict developmental hierarchy. Children tend to move back and forth across these forms when composing texts, and they often combine several different forms in the same composition. The seven categories may be described are as follows: (1) drawing as writing—pictures represent writing (age and stage of about 2½ years); (2) scribble writing—continuous lines represent writing (age and stage of about 3 years); (3) letter-like units—the child makes a series of separate marks that have some letter-like qualities (age and stage of about 3½ years); (4) non-phonetic letter strings—the child writes strings of letters that show no evidence of letter-sound relationships, and the letter strings can be random groups of letters or repeated clusters of letters (age and stage of about 4 years); (5) copying from environmental print—the child copies print found in her home and often includes her name (age and stage of about 4½ years); (6) invented spelling—the child creates his own spelling using letter-sound relationships (age and stage of about 5 years); (7) conventional writing—the child uses correct spelling for most of the words used (age and stage of about 5½ years).

Children begin to read and write informally long before they enter school. By the time children are able to pick up a writing implement, such as a pencil or crayon, and draw or scribble, they are demonstrating their knowledge that these marks mean something, and the first step toward written communication has been taken. For example, when a child watches an adult write a grocery list or a letter, or pay bills, the child may be motivated to imitate this writing. Usually, if the child is provided with appropriate writing materials (e.g., paper, markers, crayons, pencils), he will spontaneously engage in writing and will expand upon the ideas generated by his observations. Occasionally, a caregiver might actively encourage the child's writing by suggesting that the child write a letter to somebody in particular (such as a grandparent, for example) or that the child leave a note, such as for the tooth fairy, for example. Another opportunity to encourage writing is during a child's dramatic play. When children play house, for example, they can write grocery lists or leave phone messages. In these types of situations, writing materials and praise are all that a caregiver needs to provide. Children will generally write frequently, if they feel their attempts to communicate are accepted and valued as meaningful.

Learning the correct written form of a letter is called handwriting. It is an opportunity for children to gain control of the small muscles in their fingers and hands. However, handwriting drills do not teach children how to read and write. A child who exhibits excellent penmanship will not necessarily learn to read or communicate in written form any faster than the child whose writing still resembles scribbles. Critical comments about a child's handwriting efforts can stifle the joy of communicating. When a new scribe begins to learn the "how" of writing, it is far better to praise the child's efforts. This will encourage the child to write more.

Since visual awareness is one of the earliest and most powerful learning tools at a child's disposal, caregivers can encourage children to carefully observe their world. As the child grows older, for example, a caregiver can help a child to pay attention to environmental print during his preschool years as a precursor to traditional reading.

Research has demonstrated that children who have better visual abilities learn more effectively. Therefore, in one embodiment, system 100 provides and/or describes at least one activity that is selected to provide a caregiver with practice in helping a child to see the similarities and differences in objects, to match patterns in groups of objects and/or symbols, to detect change in patterns, to recognize environmental print, to enjoy drawing and writing, and/or the like, as appropriate for the child's age and stage of development.

Play and Playfulness

Play is the process by which children learn. Play allows a child to explore the physical world (objects, physical principles, and relationships) and to test her own capabilities and limits. Most importantly, play provides the child with a means for understanding herself within the context of the many relationships that the child is building with the key people in her widening world. As a child plays, the brain works to integrate incoming information from the variety of external and internal sensations into meaningful patterns. As experiences are "played out" and repeated and practiced, a child gains a sense of control over herself and her environment. When the "hard work" of making sense of the world is a joyful activity, the part of the child's brain that responds to pleasure is activated, and the child will naturally seek to repeat the process. Thus, the child will continue to play and learn and, in fact, enjoy learning.

Functional play is the most prevalent form of play during the first three years of life. It entails repetitive movement with or without objects and may include activities such as running and jumping, stacking and knocking down blocks, digging in a sand box, and bouncing a ball against a wall, for example. Starting at around 18 months, both constructive play and dramatic play appear and begin to increase. Constructive play generally involves using objects (such as blocks, Legos®, or Tinkertoys®, for example) or materials (such as sand, Play-Doh®, or clay, for example) to build something. Dramatic play entails taking on a role and using make-believe transformations to act out a situation or story. At about age 5, and continuing through adolescence, children also begin to play games with rules (i.e., games that require recognition, acceptance, and conformity with pre-established rules), such as card games, sports, and board games, for example.

Between the ages of about 4 to 6 years, constructive play is the dominant form of play, accounting for almost half of the play observed in preschool and kindergarten classrooms (due, in part, to the abundance of constructive materials in school settings). During pre-school and through first grade, dramatic play continues to increase at the expense of functional play, rising to approximately 20 to 30 percent of all play by age 6. As children enter the primary grades, dramatic play typically declines in frequency.

Several aspects of dramatic play change during the pre-school period: Dramatic play becomes more social with age. Due to limited social skills, children's first attempts at pretending are usually solitary. By the age of 3 or 4 years, many children have learned to share, compromise, and cooperate with others, and they soon begin to engage in group dramatizations with other children. The story lines children enact during dramatic play become more complex with age, changing from isolated events (e.g., feeding a doll) to complex, interrelated episodes (e.g., cooking a make-believe meal, serving it to guests, and then eating the meal while conducting polite conversation). The roles and themes children enact also change with age, becoming more creative and unusual. Initially, children adopt highly familiar roles, such as family members, for example, and enact very routine types of domestic activity, such as preparing dinner or going shopping, for example. As they mature, children take on less familiar roles, such as occupations (e.g., a doctor, a mail carrier, or a teacher) and fictional characters (e.g., Bat Man, Sleeping Beauty, Tarzan), and they begin to introduce unusual elements into their dramatizations (e.g., an earthquake may occur during a shopping trip). By providing children with appropriate literacy material, a caregiver actually offers a child additional "props" to use during dramatic play and presents the child with a rich opportunity to demonstrate what she has learned.

A child's primary caregivers (e.g., parents) are a child's first and best playmates. Not only do such caregivers have an important role in choosing good toys, but research shows that the most creative children are those who have had adult caregivers involved in their play. The richest play occurs when an adult takes an active role and plays alongside the child, rather than simply providing the toys or supervising the activity. As a child's imagination grows, he will invent new uses for familiar objects. This leap in cognitive development opens up an entirely new area of learning. Caregivers can encourage a child's efforts and join in on the fun by, for example, engaging in a child's dramatic play (e.g., pretending to hunt crocodiles or eat make-believe birthday cake with the child).

Children bring great energy and imagination to their play and are constantly developing new and creative ways to play. Because there are so many different kinds of toys and novel ways to play with them, children learn that the world is a diverse place with unlimited possibilities. Toys can have an exciting role in helping a child to become a mature, confident, and imaginative adult. Research has demonstrated that children who play and are given frequent opportunities to play learn more effectively. Therefore, in one embodiment, system 100 provides and/or describes at least one activity that is selected to provide a caregiver with practice in keeping interactions with the child positive and playful, as appropriate for the child's age and stage of development.

In an exemplary embodiment, system 100 provides an activity item 104 that can remind caregivers to keep every activity fun and exciting. An exemplary activity item 104 of this type may include some form of a puppet, such as, for example, a hand puppet of an animal, a fanciful creature, a person, a clown, and/or the like. In one embodiment, caregivers are reminded not to turn recommended activities into drill sessions. In another embodiment, caregivers are also reminded not to make performance demands on the child during the interactive session with the child. In a further embodiment, it is suggested that the caregiver "play with" the ideas presented and create fun rituals and routines as the caregiver learns to foster the child's development. It may be further suggested that if the child becomes frustrated with any of the activities, the caregiver should calmly terminate the activity and begin it again at another time. The concept of play can be an important aspect of a caregiver's success in providing an environment that encourages a willing child and fosters that child's development.

Sound and Auditory Discrimination

Science has just begun to understand the value of a child's ability to properly hear the distinct differences between words and the importance of exposing a child to a large variety of words from the time they are born. A growing body of research indicates that the ability to hear differences in sound units (known as phonemic awareness) is related to later success in learning how to read. P. Tallal, et al., "Language Comprehension in Language-learning Impaired Children Improved With Acoustically Modified Speech", *Science*, Vol. 271, pp. 81–84 (1996). There is also research that shows that the sheer number (and variety) of words that are routinely spoken directly to a child in his environment has a direct influence on the child's performance on traditional IQ tests. Some studies have suggested that listening to or singing music can have a positive effect on a child's mood, while other studies have indicated that there is a testable increase in a preschooler's spatial reasoning ability after being given piano training. F. H. Rauscher, et al., "Music and Spacial Task Performance", *Nature*, Vol. 365, p. 661 (1993).

Children begin to communicate soon after birth. They communicate by crying, cooing, and babbling. Children use these sounds (vocalizations) to express their needs and to connect to their families. As described above, caregivers who consistently respond to their children' coo and cries build the child's security, trust, and attachment. Generally, caregivers talk in a special way to newborns and infants. They tend to speak more slowly and clearly, they exaggerate their words, they raise their voice pitch, and they stretch the vowel sounds in words. For simplicity and convenience, this manner of speaking will be referred to herein as "parentese", though it will be appreciated that caregivers other than parents may speak in this manner as well.

"Parentese" is exaggerated, slowed, sing-song speech that stretches the vowels in words and allows the child to see the mouth move as the words are spoken and the language is heard. An example of such speech would be the following: "Loook at the baaaby's toooes." An infant's brain initially relies on elongated vowel sounds to process language. The rate and pitch of "parentese" perfectly matches the auditory processing speed of the infant. As the child matures, his brain eventually speeds up and processes speech at what is considered a normal rate.

Caregivers can support a child's listening and speaking development by labeling and describing objects in the environment, listening carefully to the child when the child talks, asking questions, answering questions, engaging in two-way conversations with the child, playing with the child, and reading to the child. There are two types of vocabularies: listening (receptive) and spoken (expressive). When a child is spoken to consistently, his listening vocabulary begins to develop quite early. Many children can "point to daddy's nose", for example, sometime from about 7 to 10 months old. While a child will coo and babble almost immediately, the child's use of real words usually begins around age 1, and, by about age three, many children have hundreds of words in their listening and speaking vocabularies. The more words a child hears, the larger her vocabulary will become. One study found that, at 20 months old, the children of talkative mothers had 131 more words in their vocabularies than children of quieter mothers. By age 2, the gap had widened to 295 words. E. Sulzby, *Children's Storybook Reading: Longitudinal Study of Parent-Child Interaction and Children's Independent Functioning* (Spencer Foundation, 1987). Therefore, a caregiver should be encouraged to talk to the child frequently, such as while the caregiver is going about routine daily activities, including feeding, bathing, dressing, and holding the child; doing chores around the house; and driving around town, for example.

Caregivers who show and tell a child what the caregiver is doing during the day facilitate the development of the child's capacity for language and speech. Children learn to talk when their caregivers label objects and describe actions as the child and caregiver do real-life tasks together. For example, as a caregiver and a child watch a cat walk across the room, the caregiver can label and describe the event for the child (e.g., "Robbie, look at the kitty. The kitty is walking"). Since, children learn language by closely watching and imitating the tongue and mouth movements of the people who talk to them directly, children must be able to both hear and see speech. Television is a poor substitute for a caregiver's direct interactions with a child. Not only does watching television not allow a child to see mouth movements closely enough, but television cannot connect speech to real-life tasks in the manner that a caregiver can. Children learn to talk when others talk directly to them, and the size of their vocabulary depends upon how much their caregivers talk to them. Caregivers who talk to their children while they demonstrate what they are doing help the child's brain to sort sound into words and then words into categories.

Learning to talk admittedly takes time and practice. Learning to read, however, is a much more complex skill that can only be taught if a child has specific foundational abilities, such as the ability to hear the subtle sounds of his language (phonemic awareness), the ability to distinguish symbols (letters), and the capacity to consistently link specific sounds to certain letters. From birth, a child's brain begins to set the stage for reading by constantly organizing sounds into words. The more words a child has in his vocabulary, the better able the child is to label, organize, and recall events that occur in his world.

Phonemic awareness is the ability to hear the differences in the sounds of our language. Children play with these sounds from the time they are born, and they love to play rhyming games, sing songs, and listen to stories. One way that a caregiver can help a child to learn to make the connection between the spoken and the written word is to constantly read to the child, especially the child's favorite books. Additionally, rhyming activities help a child's brain to learn to hear differences in sound. Caregivers can encourage a child's phonemic awareness by singing songs, doing finger plays, and by reading poems and stories. As a child develops the ability to turn sounds into words and words into sentences, he begins to realize that symbols can represent words. After a child can consistently hear the differences in the sounds of her language, he is soon able to learn that letters make specific sounds. Many children need direct instruction to help them learn to link letters with sounds consistently. This is referred to as phonics instruction.

Music, as a highly organized form of sound, brings many different learning elements together and helps in developing a child's physical coordination, timing, rhythm, confidence, memory, language, and imagination. Studies have shown that regular, early exposure to music also improves a child's ability to learn math and science. F. H. Rauscher, et al., "Listening to Mozart Enhances Spacial-Temporal Reasoning: Towards a Neurophysiological Basis", *Neuroscience Letters*, Vol. 185, pp. 44–47 (1995). Classical music may also help a child learn tonal patterns, which then helps the child to develop compare/contrast concepts, such as larger-smaller, softer-louder, and fast-slow, for example. Several studies have examined how certain kinds of exposure to music affect the brain. F. H. Rauscher, et al., "Music and Spacial Task Performance", *Nature*, Vol. 365, p. 661 (1993). One study demonstrated that not only did preschoolers who had weekly keyboard lessons improve their spatial-temporal skills 34 percent more than both children who took singing lessons and children who took no music lessons, but the effect had a long-term impact on the children's development of these skills. F. H. Rauscher, et al., "Listening to Mozart Enhances Spacial-Temporal Reasoning: Towards a Neurophysiological Basis", *Neuroscience Letters*, Vol. 185, pp. 44–47 (1995).

Research has demonstrated that children who have an extensive vocabulary and understand related language concepts learn more effectively. Therefore, in one embodiment, system 100 provides and/or describes at least one activity that is selected to provide a caregiver with practice in helping a child to listen carefully to the sounds of language, to enjoy being read to, to engage in musical activities, to foster a desire to engage in early music training, and/or the like, as appropriate for the child's age and stage.

In summary, by consistently engaging a child at every age and stage of development in stage-specific activities that variously stimulate each of these five selected aspects of early brain development, caregivers promote a child's healthy brain development at each age and stage. In one embodiment, each of the provided and/or described activities includes an indication of the particular brain region or regions known to process information that is visual (vision), auditory (sound), kinesthetic (touch), and emotional (security). In another embodiment, the concept of play is incorporated into a particular activity that is provided or described in system 100. In a further embodiment, the concept of play is integrated into each activity performed during an interactive session between a caregiver and a child and activities are accomplished in playful ways. When interactions are enjoyable for both the child and the caregiver, these interactions are more often repeated, and repetition has been demonstrated to be an important aspect or condition for effective learning.

In addition to understanding the above five selected aspects of brain development, caregivers are encouraged to learn and to apply three additional concepts that promote early brain development and that can be used in providing an optimal environment for healthy, early brain development. These three concepts are attention, bonding, and communication. Each of these concepts will be described in turn.

Attention

In order for anyone to learn anything, they must first be paying attention to what is being taught. Children learn from their adult caregivers that paying attention is appropriate behavior. Conversely, children who are not "well attended to" by their caregivers also learn, over time, not to pay attention. Studies conducted on young children who were deprived of adult attention to their needs during their early developmental years have shown, through brain scans performed on the children once they were older, that these children experienced abnormal brain development in the area that specializes in the ability to focus one's attention. H. T. Chugani, "A Critical Period of Brain Development: Studies of Cerebral Glucose Utilization with PET", *Preventative Medicine*, Vol. 27, pp. 184–188 (1998). A child's ability to pay attention is developed with practice, over time. A caregiver can teach a very young child to focus her attention and can encourage the child to increase her attention span.

Scientists have discovered that there are certain factors that affect the development of the brain's ability to pay attention. J. Ormrod, *Educational Psychology: Developing Learners* (Prentice-Hall, Inc., 2000). Each of these five factors, as applied to the early care of children, is described in turn.

1. Meeting a Need Predictably: Starting from birth, an infant should have his needs met by an attentive, responsive adult. Infants who receive predictable care are less fussy and less demanding than infants who have to wait and wonder when someone will respond to them. Thus, a caregiver who desires to help a child in developing the skill of focusing his attention should observe the child and respond in a timely manner to his needs for food, having a diaper changed, and being held, for example.

2. Eye Contact and the Human Face: Infants and babies have a "built-in" preference for the human face. Scientists have demonstrated that infants will attend to a face longer than they will attend to anything else with which they are presented. Children need to see and interact with real people, rather than faces on television or pictures of people or objects. Thus, a caregiver who desires to help a child in developing the ability to focus his attention should also frequently look at the child, face-to-face, and attempt to maintain eye contact with the child for longer periods of time by smiling, using changing facial expressions, and talking to the child while both are focusing upon each other, for example.

3. Novelty: Young children love to look at objects that are new and different. By the time an infant is several months old, he may have already "figured out" his immediate surroundings. He will notice when something in his environment has changed and will attend to something in his environment that is new for a longer period of time than he will attend to those things that are familiar to him. Thus, a caregiver who desires to help a child in developing the ability to focus his attention should show the child new things in a way that demonstrates excitement and surprise, for example. In attempting to purposefully engage the child's attention, caregivers may also vary their voice intonation and/or alter their facial expressions as they introduce something new to the child.

4. Great Contrasts: Young children generally pay closer attention to objects that have clear, deep, or sharp contrasts than to those objects that are pale, blended, or very "busy". For example, research on vision has shown that high contrast colors like black and white, or red and black and bright yellow, for example, are helpful in getting and maintaining an infant's attention. As infants become toddlers and then preschoolers, they continue to pay attention to contrasting relationships. For example, they will attend to things that are very large and also to things that are very tiny; they will respond to sounds that are loud and also to sounds that are soft. There are many such contrasting elements that can help a caregiver gain a child's attention.

Thus, a caregiver who desires to help a child in developing the ability to focus his attention can provide the child, as an infant and then as a baby, with toys that will attract and hold his attention due to the use of bright colors and/or contrasting elements. Further, caregivers may vary their voice intonations in ways that vary their voice's volume, pitch, intensity, and/or inflection, depending upon the child's preference. A caregiver can capture and maintain the child's natural attentiveness to things that stand out. Caregiver's may also make occasional and purposeful obvious mistakes that may make the child laugh, or a caregiver may sometimes become a character in the child's favorite book and act out the story. By teaching the child to "expect the unexpected", a caregiver helps to increase the child's ability to pay attention to people and objects in his environment.

5. The Search for Meaning: A caregiver who desires to help a child in developing the ability to focus her attention may allow the child to interact actively with the environment, permitting the child to discover the consequences of her actions and presenting the child's brain with the opportunity to ascribe meaning to those actions. In this manner, a caregiver can leverage the child's innate curiosity to assist the child in developing her understanding of, inter alia, causal relationships.

System 100 is designed to guide a caregiver in purposefully helping a child to learn to pay attention. In an exemplary embodiment, system 100 comprises one or more items whose use by a caregiver can help a child to learn to pay attention. For example, the system 100 may comprise an activity mat 108; information and/or instructional materials 106 which direct a caregiver to cue a child's anticipation through slow, deliberate actions; and/or information and/or instructional materials 106 which direct a caregiver to cue a child by providing the child with simple commands.

In an exemplary embodiment, the system 100 includes an activity mat 108. The activity mat 108 may be any type of defined, substantially flat surface that can be used during an interactive session with the child. In one embodiment, the activity mat 108 is portable and may be easily employed during a session and then put away after a session is completed. The activity mat 108 may be of any shape and dimension, may be either flexible or rigid, and may be made from cloth, wood, plastic, bamboo, cardboard, vinyl, paper, ceramics, and/or the like. In one embodiment, the activity mat 108 is a placemat. In another embodiment, the activity mat 108 is deliberately plain (without patterns or cartoons or printed words), since the child should be encouraged to focus on the shared activity rather than any potentially distracting details of, for example, a patterned activity mat surface. Such distractions may defeat the purpose of the activity mat 108, which is to help the child to understand where and when to pay attention.

The activity mat 108 is a visible, concrete cue or message to the child that the caregiver wants the child to pay attention to the "work" (which is really play) that the caregiver and the child will be engaging in. The activity mat 108 defines or designates the "work space" of the interactive session with the child. Later, older children and adults generally transfer this same concept to the traditional "desk top workspace". The use of the activity mat 108 deliberately and consistently cues, and eventually teaches, a young child how to pay attention by directing their attention both to the activity mat 108 and to the activity that the caregiver wants the child to concentrate on.

In an exemplary embodiment, as the caregiver spreads the activity mat 108 out in front of the child, the caregiver can show an expression of excitement and anticipation. This also signals to the child that the caregiver believes that what is about to take place is both important and pleasurable. If the child comes to associate pleasure and anticipation with paying attention, the child receives a message that can positively impact his future ability to learn.

In another exemplary embodiment, the system 100 includes information and/or instructional materials 106 which direct a caregiver to cue a child's anticipation through slow, deliberate actions. When a caregiver first presents the child with an activity, the caregiver's movements can be slow and deliberate, and the caregiver can also allow their facial expression to show anticipation. As the caregiver places the activity onto the activity mat 108 in front of the child, the caregiver can gain the child's eye contact as the caregiver slowly begins to reveal what the caregiver and the child are going to be doing together. If the caregiver performs this ritual consistently, the child will then learn, over time, to anticipate the fun and excitement of what she is about to learn.

In another exemplary embodiment, the system 100 includes information and/or instructional materials 106 which direct a caregiver to cue a child by providing the child with simple commands. In one embodiment, instructional materials 106 comprise an activity card 200 which includes a "Directions" section that may provide suggested words that the caregiver may say to the child to help gain the child's attention. Unless the particular activity is designed to elicit talk and conversation between the caregiver and the child, the directions on an activity card 200 generally give a very simple "script" of what the caregiver may say to the child, such as "Say: 'Watch'". Simple, quiet commands or instructions stand out for the child and effectively cue the child's attention. A caregiver's modeling of an activity for the child can include facial anticipation (e.g., eyes wide-open, eyebrows raised), soft, slow speech, and minimal verbal cues, for example. After the activity has been modeled by the caregiver, showing clearly how the caregiver accomplishes the activity, then the caregiver cues the child slowly and quietly by indicating that it is the child's turn to do the activity. For example, the caregiver may say "Now, it's your turn!" or "Now you try it!".

Bonding

Scientists generally agree that an important factor in developing and maintaining healthy brain structures is the child's development of a strong bond, or connection, to at least one primary caregiver. The manner in which the various regions of the brain develop, as well as the ways in which the brain ultimately will process information, begin to form very early in life. Child development specialists agree that infants, babies, toddlers, and preschoolers require predictable, responsive care if their brains are to develop optimally. National Research Council and Institute of Medicine, Jack P. Shonkoff and Deborah A. Phillips, eds., *From Neurons to Neighborhoods: The Science of Early Childhood Development* (National Academy Press, 2000). When children learn that someone in particular pays attention to their needs, they develop trust and a sense of security that then allows their brain to attend to the many learning opportunities around them. Without this sense of being bonded or attached to at least one person, the brain of a young child does not develop optimally.

In view of the fact that research has shown that repeated stressful experiences (e.g., consistently not having needs met or early neglect or abuse) can create synaptic circuits in the brain that interfere with a brain's healthy growth. M. R. Gunnar, "Quality of Early Care and the Buffering of Neuroendocrine Stress Reactions: Potential Effects on the Developing Human Brain", *Preventative Medicine*, Vol. 27 (2), pp. 208–211 (1998). The system 100 teaches caregivers to protect a child's developing brain by creating loving, predictable, day-to-day care for the child. Responsive care helps build resiliency in the growing child. Resiliency, or the ability to recover from set-backs, protects a child from overreacting to later stresses that occur throughout life. National Research Council and Institute of Medicine, Jack P. Shonkoff and Deborah A. Phillips, eds., *From Neurons to Neighborhoods: The Science of Early Childhood Development* (National Academy Press, 2000).

Moreover, simple, repeated, interactions between a caregiver and a child provide an environment in which appropriate bonding can occur. For example, research has demonstrated that loving touch actually releases growth hormones that enable a child's brain and body to grow. Holding, rocking, and stroking stimulate the brain to grow and develop. Establishing and maintaining routines and rituals help a child in learning to regulate his responses. Internal self-regulation is an important facet of healthy overall development. National Research Council and Institute of Medicine, Jack P. Shonkoff and Deborah A. Phillips, eds., *From Neurons to Neighborhoods: The Science of Early Childhood Development* (National Academy Press, 2000).

Communication

The two-way nature of communication helps a child to develop strong concepts and understandings about people and objects in the world around him. Face-to-face, human contact and conversation allows a child's brain to develop the capacity to understand, label, and interpret experiences. Language and intelligence are closely intertwined as the child's brain develops. A caregiver who is reminded to talk to the child throughout the day, as they interact with the child, is provided with an easy, inexpensive, and effective strategy in helping to facilitate the child's brain development.

Reading aloud to a child exposes the child to many rich, new words that may not normally occur in daily life around the home or in a daycare setting. For example, the word "Giraffe" likely will not come up in everyday conversation while a caregiver is shopping, working, or relaxing during the day. However, by reading a story about a giraffe (which may include a clear picture of a giraffe) to the child, a caregiver introduces the child to an entirely new idea. When a caregiver reads to a child, the caregiver gives the child the opportunity to comprehend more words and concepts than the child would otherwise learn within the context of daily life.

Listening to a child is another way that a caregiver can demonstrate that the child is important to the caregiver.

Responsive care continues throughout childhood and can be achieved at any age by listening to the needs and ideas that a child expresses.

In summary, the intelligence that a child develops generally unfolds through the relationships with the child's primary caregivers. A child's ability to think, communicate, and focus attention, as well as her ability to exercise self-control and to feel compassion for other people, can be encouraged continuously throughout the earliest years of life and beyond. Normal, healthy brain growth can be protected and stimulated through simple, easily accomplished, daily interactions with a caregiver. Rather than assuming that every caregiver knows how to go about establishing such interactions and providing an environment that fosters optimal early brain development, the system of the invention presents caregivers with a variety of tools that can help guide them in facilitating the early brain development of a child in their care.

It will be appreciated that an activity that may be used to stimulate one or more predetermined aspects of brain development (e.g., security and emotional attachment, touch and sensory integration, vision and visual discrimination, play and playfulness, and sound and auditory discrimination) may also be used to foster one or more of the three concepts that promote early brain development. The charts of FIGS. 3A and 3B illustrate exemplary activities that stimulate the various predetermined aspects of brain development as well as foster the concepts that promote early brain development.

EXAMPLES

The following examples of systems and methods for facilitating early childhood brain development are provided to more specifically describe the invention. These exemplary systems and methods are intended to be merely illustrative and are not intended to limit the description provided above. It will be appreciated that various other embodiments may be practiced, given the above general description.

Exemplary Systems

The charts of FIGS. 4A and 4B illustrate exemplary systems in accordance with the invention. As seen in FIGS. 4A and 4B, systems for each of the four ages and stages (i.e., infant, baby, toddler, and preschooler) comprise activities that correspond to each of the five aspects of early childhood brain development (i.e., security and emotional attachment, touch and sensory integration, vision and visual discrimination, play and playfulness, and sound and auditory discrimination). Each of the exemplary activities presented in FIGS. 4A and 4B corresponds to an activity that uses an activity item 104 and/or to an activity that is described on an activity card 200 and for which the caregiver supplies any needed items.

Exemplary Activity Cards

FIGS. 5–8 illustrate exemplary activity cards that may be included in a system 100 that is adapted for use with a child at the infant stage (FIG. 5), the baby stage (FIG. 6), the toddler stage (FIG. 7), or the preschooler stage (FIG. 8).

Exemplary Methods

In an exemplary embodiment, a caregiver facilitates a child's early brain development by obtaining stage-specific activity cards which can be used to guide a caregiver in engaging in a purposeful, interactive play session with a child; obtaining at least one activity item which can be used by the caregiver during the play session to stimulate at least one predetermined aspect of brain development, where the predetermined aspect of brain development comprises security and emotional attachment, touch and sensory integration, vision and visual discrimination, play and playfulness, and sound and auditory discrimination; selecting one of the activity cards which describes at least one activity that stimulates a predetermined aspect of brain development and provides directions which instruct the caregiver in facilitating the interactive play session with the child; engaging the child's attention, as described in detail above, to begin the play session; modeling the selected activity for the child to instruct the child how to perform the activity; and prompting the child to perform the activity.

In another exemplary embodiment, the caregiver and the child interact in a playful manner. In a further embodiment, the caregiver interacts with the child in a manner that fosters one or more of the three concepts that promote early brain development. For example, the caregiver can use an activity mat to assist in focusing the child's attention on the shared activity. Alternatively, or additionally, the caregiver may hold the child on the caregiver's lap to foster the child's bonding to the caregiver. In another embodiment, the activity itself may advance one of the concepts that promote early brain development. For example, if the shared activity is reading a story to the child, the activity fosters the concept of communication.

In another exemplary embodiment, the caregiver engages and focuses the child's attention by establishing eye contact with the child and directing the child's attention to a defined space, such as an activity mat that is placed in front of the child, for example. The caregiver may further engage the child's attention by encouraging the child with a visual stimulus (e.g., an object, such as a toy, and/or varied facial expressions) and/or an auditory stimulus (e.g., varied voice intonations, such as varied volume, pitch, intensity, and/or inflection, for example, and/or the use of a sound-generating object, such as a rattle or a musical toy, for example).

In another exemplary embodiment, the caregiver prompts the child to perform the activity by providing instructions to the child in a predetermined manner, such as by speaking slowly, speaking quietly, speaking simply, speaking excitedly, and/or giving the child minimal verbal cues.

The foregoing specification describes the invention with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Further, no element described herein is required for the practice of the invention unless expressly described as "essential" or "critical".

The invention claimed is:

1. A method for facilitating early brain development, said method comprising:

analyzing a plurality of activity items to determine how said pluralirv of activity items stimulates a predetermined stage of brain development to create a brain link, wherein said brain link includes a specific area of the brain that is stimulated by a subset of said plurality of activity items, wherein said predetermined stage of brain development includes at least one of security and emotional attachment, touch and sensory integration, vision and visual discrimination, play and playfulness, and sound and auditory discrimination and wherein said plurality of activity items includes a hand game, book, activity mat, musical toy, song, nursery rhyme, rattle, ball, blocks, scoop, water, beads, puzzles, treasure, scissors, writing instrument, clothes, puzzle, toy animal, numbers, alphabet letters, and puppet;

determining how said predetermined stage of brain development promotes early development of future school skills in a child to create a school link, wherein said school skills include emotional stability, self-esteem, love of books, new vocabulary, dexterity, eve-hand coordination, spatial reasoning, pattern matching, word matching, social skills, spatial-temporal skills, emotional attachment, self-esteem, conscience, identity, language development, organization, mathematics, reading recognition, reading comprehension, spelling, habituation, orientation, eye/hand coordination, phonemic awareness, phonics, conventions of print, motor skill, sensor integration, attending skills, dexterity, writing skills, cognitive skills, perceptual skills, connecting words with actions and objects, self-regulation, bonding skills, visual awareness, spatial reasoning, communication skills, receptive and expressive vocabulary skills, comparing and contrast skills, and attention skills;

creating an activity card related to said subset of said pluralirv of activity items, said activity card providing instructions to promote said predetermined stage of brain development in a predetermined manner, said activity card having a first area that identifies said brain link, a second area that identifies said school link, and a third area that identifies the activity, materials needed, directions to implement the activity and extensions and variations on said directions;

including said subset of said plurality of activity items in a housing specifically related to said predetermined stage, such that said housing includes at least one activity item related to each of said predetermined stage of brain development;

providing instructions for selecting said activity card which include an explanation of; the appropriate stage targeted by said activity card, the age for which said activity card is suggested, the importance of said selected activity card to said predetermined stage of brain development, background information about said activity items included on said activity card, the importance of said selected activity card to said early development of future school skills, materials needed for said selected activity card, directions on how to specifically perform said activity items, suggestions about what to say to said child, general remarks, indications of where and when for said child to pay attention, and extensions and variations of activity items, wherein said activity card comprises caregiver directions for facilitating an interactive play session with said child to achieve said school link and said brain link, said activity card instructing said caregiver to engage a child's attention using a visual stimulus, an auditory stimulus, a kinesthetic stimulus, and an emotional stimulus, wherein said visual stimulus comprises at least one of varied facial expressions and use of an object and wherein said auditory stimulus comprising use of a sound-generating object and varied voice intonations wherein said varied voice intonations comprise at least one of volume, pitch, intensity, and inflection;

providing at least one of an alternate activity item and a list of activity variations, wherein each of said alternate activity items and said activity variations promotes at least one of said predetermined stage of brain development and a predetermined concept that promotes early brain development; and, providing said plurality of activity items to said caregiver to facilitate stimulating said predetermined stage of brain development by promoting early brain development comprising attention, bonding, and communication, said brain link and said school link by engaging said child's attention to facilitate said interactive play session with said caregiver, modeling said selected activity for said child using said item from said housing, following said directions on said activity card to instruct said child how to perform said selected activity, and prompting said child to perform said selected activity by providing instructions to said child in a predetermined manner, wherein said predetermined manner comprises of speaking slowly, speaking quietly, speaking simply, speaking excitedly, and giving minimal verbal cues.

* * * * *